US012333910B2

(12) United States Patent
Amaitis et al.

(10) Patent No.: US 12,333,910 B2
(45) **Date of Patent: *Jun. 17, 2025**

(54) TIERED GAMING

(71) Applicant: CFPH, LLC, New York, NY (US)

(72) Inventors: Lee Amaitis, Las Vegas, NV (US); Matthew Holt, Las Vegas, NV (US); Mike Colbert, Las Vegas, NV (US); Reed Stephens, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,993

(22) Filed: Nov. 21, 2022

(65) Prior Publication Data

US 2023/0077796 A1 Mar. 16, 2023

Related U.S. Application Data

(63) Continuation of application No. 17/193,105, filed on Mar. 5, 2021, now Pat. No. 11,508,216, which is a continuation of application No. 16/417,733, filed on May 21, 2019, now Pat. No. 10,943,437, which is a continuation of application No. 13/835,222, filed on Mar. 15, 2013, now Pat. No. 10,332,354.

(60) Provisional application No. 61/668,245, filed on Jul. 5, 2012.

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/3274* (2013.01); *G07F 17/3276* (2013.01)

(58) Field of Classification Search
CPC ............. G07F 17/3276; G07F 17/3288; G07F 17/3274; G06Q 50/34
See application file for complete search history.

(56) References Cited

U.S. PATENT DOCUMENTS

| | | | | |
|---|---|---|---|---|
| 2010/0285857 A1* | 11/2010 | Anderson | G07F 17/32 | 463/9 |
| 2011/0034225 A1* | 2/2011 | Butz, Jr. | A63F 13/75 | 463/43 |
| 2012/0329542 A1* | 12/2012 | Sloan | A63F 13/00 | 463/9 |
| 2013/0072305 A1* | 3/2013 | Saks | A63F 13/833 | 463/42 |

* cited by examiner

*Primary Examiner* — Steve Rowland

(57) ABSTRACT

Some embodiments include a fantasy sports wagering game. A gaming operator may assign real life sporting players into brackets based on their expected performance so that players with similar expected performance are in a same bracket as each other. Participants in a fantasy sports wagering game may be required to select a player from each of a plurality of brackets to form a fantasy sports team for the fantasy sports wagering game.

20 Claims, 2 Drawing Sheets

TIERED GAMING

CROSS-REFERENCE TO RELATED APPLICATIONS

This patent application is a continuation of U.S. patent application Ser. No. 17/193,105 filed Mar. 5, 2021, which is a continuation of U.S. patent application Ser. No. 16/417,733 filed May 21, 2019 (now U.S. Pat. No. 10,943,437 issued Mar. 9, 2021), which is a continuation application of U.S. patent application Ser. No. 13/835,222 filed Mar. 15, 2013 (now U.S. Pat. No. 10,332,354 issued Jun. 25, 2019), which claims the benefit of U.S. Provisional Application No. 61/668,245 filed Jul. 5, 2012, the disclosures of which are hereby incorporated by reference herein in their entireties.

FIELD

Some embodiments may relate to sport events, games based on actions of players in live sport events, other types of events, and/or other types of games.

BACKGROUND

Gaming may include risking an amount of money that one event will or will not happen. Fantasy sports may include one or more games related to events taking place in real sports games.

SUMMARY

Figure 1:
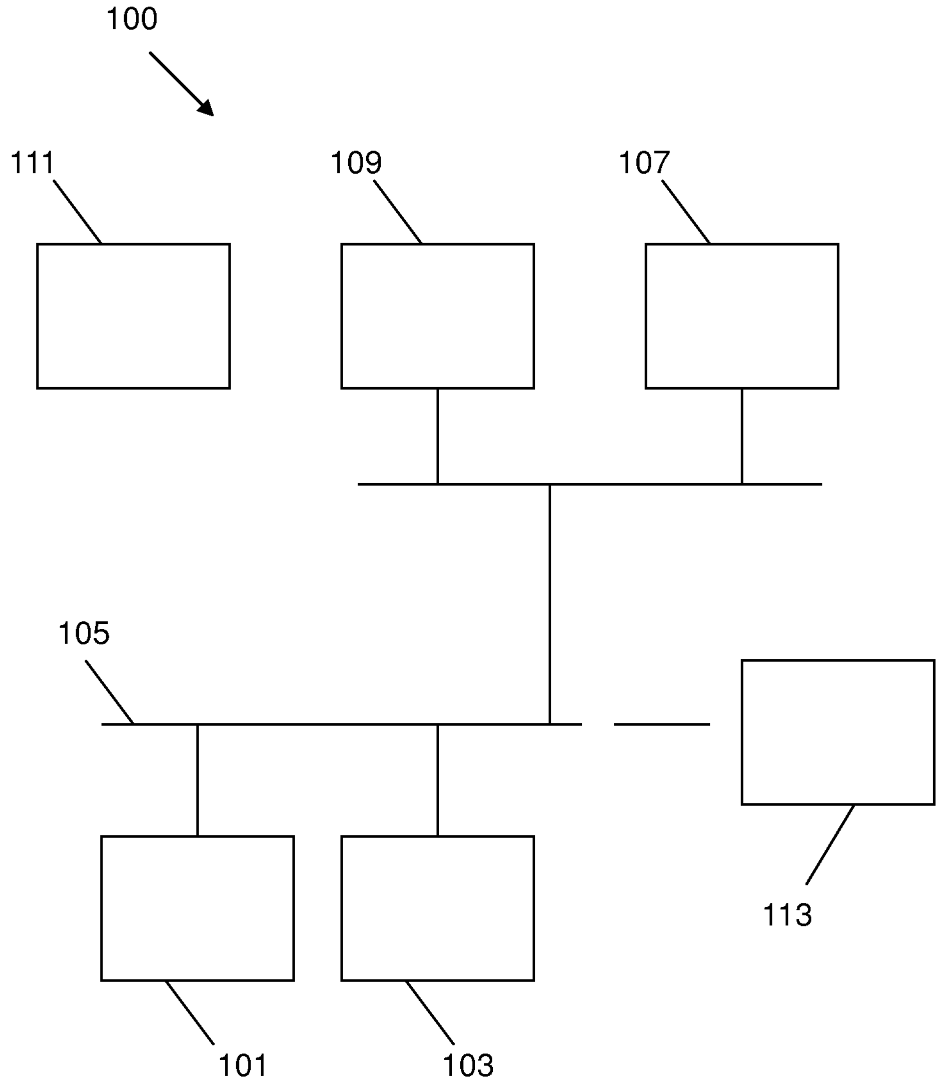
FIG. 1 shows an example system that may be used in some embodiments.

The following should be understood to be embodiments, not claims.

A. An apparatus comprising: a computing device; and a non-transitory medium having stored thereon a plurality of instructions that when executed by a computing device cause the apparatus to: receive information identifying a plurality of players that will play in sporting events; receive information identifying respective past performance of each of the plurality of players in past sporting events; for each player of the plurality of players, determine a respective expected fantasy sports score based on the past performance of the respective player, in which each expected fantasy sports scores identifies a respective expected number of fantasy sports points that a respective player will earn when selected for a team in a fantasy sports game that is based on a plurality of sporting events; based on the determined expected fantasy sports scores, assign at least some of the plurality of players to one of a plurality of player tiers, in which each player tier includes players that are determined to have similar expected fantasy sports scores; require that each participant of a plurality of participants in the fantasy sports game selects one respective player from each of the plurality of tiers to form a respective fantasy sports team for the fantasy sports game; and determine an outcome of the fantasy sports game based on the performance of the selected players in the plurality of sporting events.

A.1. The apparatus of claim A, in which the instructions cause the apparatus to: determine a required number of participants for the fantasy sports game; allow participants to join the fantasy sports game until the required number of participants are reached; and determine that the fantasy sports game should be played based on the required number of participants being reached. A.1.1. The apparatus of claim A.1, in which the instructions cause the apparatus to: determine that for a second fantasy sports game that a second required number of participants joining the second fantasy sports game is not reached, and in response to that determination, canceling the second fantasy sports game.

A.2. The apparatus of claim A, in which the instructions cause the apparatus to: receive information identifying which sporting position in the plurality of sporting events each of the plurality of players plays; in which assigning each player to one of the plurality of player tiers includes assigning each player to a tier that is both based on excepted fantasy sports scores and is defined to include only players in a single sporting position. A.2.1. The apparatus of claim A.2, in which each fantasy sports team of each player in the fantasy sports game is required to include a respective player from each tier, in which multiple tiers of the plurality of tiers are tiers for a same sporting position but different expected fantast sports score levels.

A.3. The apparatus of claim A, in which the fantasy sports game includes a required buy in amount that each participant of the plurality of participants pays to play in the fantasy sports game; in which fantasy sports game includes a payout amount that is paid based on the outcome of the fantasy sports game. A.3.1. The apparatus of claim A.3, in which the instructions cause the apparatus to: assign the payout amount to an account of a winning participant of the plurality of participants in response to determining the outcome. A.3.2. The apparatus of claim A.3, in which the instructions cause the apparatus to: split the payout amount among multiple participants of the plurality of participants in response to the multiple participants each earning a same highest score in the fantasy sports game.

A.4. The apparatus of claim A, in which the instructions cause the apparatus to: receive a request from a first participant of the plurality of participants to form the fantasy sports game, in which the request identifies a number of participants of the plurality of participants, an identify of the others of the plurality of participants, and a buy in amount for entering the game that is payable to a gaming operator operating the computing device; and in response to receiving the request, inviting the others of the plurality of participants to the fantasy sports game, charging the first participant and one or more others of the plurality of participants the buy in amount, and determining a payout for winning the fantasy sports game based on a number of the plurality of participants and the buy in amount. A.5. The apparatus of claim A, in which the instructions cause the apparatus to: receive a request from a first participant of the plurality of participants to from the fantasy sports game, in which the request identifies a number of participants of the plurality of participants, an identify of the others of the plurality of participants, and a payout amount that is payable from a gaming operator operating the computing device based on the outcome; and in response to receiving the request, inviting the others of the plurality of participants to the fantasy sports game, determining a buy in amount based on a number of the plurality of participants and the payout amount; and charging the first participant and the others of the plurality of participants the buy in amount.

A.6. The apparatus of claim A, in which the plurality of players include a subset of players that participate in the sporting events. A.7. The apparatus of claim A, in which to determine the outcome, the instructions cause the apparatus to: for each tier, determine which participant of the plurality of participants selected a highest performing player based on play in one or more of the plurality of sporting events; and determine a winner of the fantasy sports game to be a participant that selected the most number of said highest performing players.

A.8. The apparatus of claim A, in which to determine the outcome, the instructions cause the apparatus to: for each tier, determine which participant of the plurality of participants selected a highest performing player based on play in one or more of the plurality of sporting events; and determine that at least two participants of the plurality of participants selected an equal and highest number of said highest performing players; and in response to determining that at least two participants of the plurality of participants selected the equal and highest number of said highest performing players, applying a secondary outcome determination method. A.8.1. The apparatus of claim A.8, in which the secondary outcome determination method includes determining the outcome based on a comparison of sums by which each participant of the at least two participants won each of the tiers won by the two participants. A.8.2. The apparatus of claim A.8, in which the secondary outcome determination method results in a tie and in which the instructions cause the apparatus in response to the tie to: split a prize pool for the fantasy sports game between the at least two participants.

A.9. The apparatus of claim A, in which to determine the outcome, the instructions cause the apparatus to: for each participant, determine a sum of fantasy sports scores earned by the players selected by the participant based on play in one or more of the plurality of sporting events; and determine a winner of the fantasy sports game to be a participant that has the highest said sum. A.10. The apparatus of claim A, in which to determine the outcome, the instructions cause the apparatus to: for each participant, determine a sum of fantasy sports scores earned by the players selected by the participant based on play in one or more of the plurality of sporting events; and determine a winner of the fantasy sports game to be a participant that has the lowest said sum. A.11. The apparatus of claim A, in which the instructions cause the apparatus to: determine a respective range of fantasy sports scores for each of the plurality of player tiers; and in which to assign the at least some of the players, the instructions cause the apparatus to: assign each player of the at least some of the players to a respective single tier that is defined by a range in which the player's expected fantasy score falls.

A.12. The apparatus of claim A, in which to assign the at least some of the plurality of players, the instructions cause the apparatus to: determine which of the plurality of players will start in the sporting events; and assign only at least part of said starting those to the plurality of player tiers. A.13. The apparatus of claim A, in which the instructions cause the apparatus to: define each tier of the plurality of player tiers to include a set number of players. A.14. The apparatus of claim A, in which the instructions cause the apparatus to: providing an interface through which each participant may select a player from each of the plurality of player tiers to from that player's team for the fantasy game.

A.15. The apparatus of claim A, in which each tier is defined to include different players from every other tier, in which each tier is defined so that players in the tier include similarly valued expected fantasy sports scores, and in which each participant is required to select one and only one player from every tier to play the fantasy sports game. A.15.1. The apparatus of claim A.15, in which similarly values expected fantasy sports scores include scores within a range, within a percentage of a target value, within 5% of one another, within 5% of a target value, within a numerical value from one another, within 5 points from one another, within 5 points form a target value, within a range of player percentages so that qualitatively similar players are grouped together. A.15.2. The apparatus of claim A.15, in which each tier is defined so that players in the tier play the same sporting position.

B. A method comprising: receiving, by a computing device, information identifying a plurality of players that will play in sporting events; receiving, by the computing device, information identifying respective past performance of each of the plurality of players in past sporting events; for each player of the plurality of players, determining, by the computing device, a respective expected fantasy sports score based on the past performance of the respective player, in which each expected fantasy sports scores identifies a respective expected number of fantasy sports points that a respective player will earn when selected for a team in a fantasy sports game that is based on a plurality of sporting events; based on the determined expected fantasy sports scores, assigning, by the computing device, at least some of the plurality of players to one of a plurality of player tiers, in which each player tier includes players that are determined to have similar expected fantasy sports scores; requiring, by the computing device, that each participant of a plurality of participants in the fantasy sports game selects one respective player from each of the plurality of tiers to form a respective fantasy sports team for the fantasy sports game; and determining, by the computing device, an outcome of the fantasy sports game based on the performance of the selected players in the plurality of sporting events.

DETAILED DESCRIPTION

I. Example Embodiments

Colloquially, gaming may be referred to as wagering but it should be understood that embodiments are not limited to the statutory definition of wagering that is limited to games of chance but rather may include games of skill, fantasy games, games of chance, and/or any other type of games, and therefore the term gaming may be used when discussing some embodiments rather than the term wagering. Gaming may include a risk of an amount of money that some event will happen. Such risk may be skill and/or risk based, booked and/or pari-mutuel, and/or take any form desired. Gaming may include paying a fee to enter into a contest that is based on the occurrence of an event. The winner of such a contest may be provided with an award (e.g., money based on a sum of contest entry fees). Wagering may be used herein to refer to such skill or risk based gaming in some instances and should not be understood to be limited to one or the other type of gaming unless specified otherwise. Gaming may include wagering, betting, risking money, paying an entry fee to a contest, and/or any other form of gaming as desired. Various embodiments may apply to any type of gaming in any combination and/or arrangement.

Some embodiments may relate to fantasy events and/or gaming related to fantasy events. Various examples are given in relation to a popular variation of fantasy events, namely fantasy sports, but it should be understood that various embodiments may include any fantasy event. In some embodiments, fantasy sports may provide a manner for a participant to act in a role similar to a coach and/or general manager. In some embodiments, a participant may be given the ability to draft, create, trade, dismiss and/or otherwise manage a fantasy team. Some examples of fantasy gaming are described in U.S. patent application Ser. Nos. 12/605,826; and 13/160,746, which are hereby incorporated herein by reference.

Fantasy Gaming Examples

The events, participants, and/or members to which a fantasy event may be related may include any desired events, participants, and/or members. For example, some events may include political events (e.g., elections), sporting events (e.g., football, baseball, basketball, hockey, soccer, rugby, golf, tennis, automotive racing, animal racing), competitions (poker, test taking, rock throwing, tree growing), other events, and so on. For example, some participants and/or team members may include politicians, human players, animal participants, robots, natural phenomena, plants, physical things, and so on. It should be recognized that fantasy event competitions may be constructed based on any kind of activity. For example, fantasy competitions may be constructed based on an activity in which participants in the fantasy competition may compete vicariously based upon observations or statistics regarding some underlying activity (e.g., wind speed, elections, tree growth, baseball, and so on).

In some embodiments, a gaming operator may facilitate game play between multiple players. In some embodiments, a game may be a fantasy game. It should be recognized that embodiments are not limited to fantasy games but that examples are given in terms of a fantasy game in a non-limiting manner. Further examples of fantasy games are described herein. These examples are given as non-limiting examples only. Various features discussed may be combined with any fantasy game in any manner or combination.

A fantasy team for an activity may include one or more members that each correspond to one or more respective real and/or active participants in the activity. For example, a fantasy team for a sport may include one or more players of the sport. The players may include active players in a real league for the sport. The players may include active league players from one or more real sports league.

In some embodiments, a member of a team may include a portion of a real team. For example, in some embodiments, in addition to and/or as an alternative to a particular member of a team being selected for a fantasy team, a portion of a team may be selected for a fantasy team. For example, a defensive team of a football team may be selected for a fantasy team regardless of actual members of the defensive team. Accordingly, scoring of such a fantasy team may relate to actions and/or performance of the entire defensive team rather than a single member of the team.

In some embodiments, a participant in a fantasy sports game may select members to form a fantasy team for a sport. In some embodiments, a participant may select or "draft", currently active real-life players to form a fantasy team. Accordingly, a fantasy team for a sport may include a plurality of members that each correspond to a respective player of the sport. In some embodiments, a selected member for a fantasy team may include a group of players (e.g., the defense of a particular football team may be a member of a fantasy team, the outfield of a particular baseball team may be a member of a fantasy team, and so on) and/or non-players (e.g., fans, head coach).

In some embodiments a plurality of participants may form a fantasy league and select players in the fantasy league. Each player in the league may pay a fee to join the league. The fee may be pooled by a gaming operator for use in award payment, booked by the gaming operator as a wager, and/or paid to the gaming operator as a fee. The fantasy league may be referred to as a fantasy game, and the winning participant in the league may receive some award (e.g., from the gaming operator, from pooled funds held by the gaming operator, based on a fee paid to join the league, etc.). As an example, in a fantasy football league, a plurality of league participants (e.g., two) may each select one or more professional football players (e.g., 5) onto their fantasy team and pay a fee to be part of the league (e.g., $10). Based on performance of those selected players in real sports events, the participants may earn points in the fantasy sports league and a winner may be determined and paid an award (e.g., $20 minus some rake taken by the gaming operator).

It should be recognized that the form of risk and/or relationship between and/or among the parties to such a game and/or a gaming operator may take any form. Terms such as form a game are used in a broad sense to refer to any such form. For example, a wager may be established directly between two participants, a contractual obligation may be established between a gaming operator and each of the participants separately, a pari-mutuel pool may be established into which money may be placed, a book of bets may be formed into which money may be placed, and/or any desired method of forming a game may be used. In some embodiments, to form a game, each participant in a game may pay a contest entry fee to enter the contest. Such fees may be pooled together and used to pay a winner. A data structure may record information regarding formed games, and/or other information about gamers and/or games.

In some embodiments, a central authority (e.g., a gaming operator) may establish and/or enforce rules for a fantasy sports game. Such a central authority may include a casino, a server, a house, a book maker, a web site, and/or any other desired gaming operator. Such a central authority may be referred to as a commissioner, and/or a treasurer. In some embodiments, multiple entities may operate as separate parts of such a central authority (e.g., one treasurer and one commissioner). In some embodiments, the central authority may be configured to determine outcomes of a game, accept wagers, adjust balances, accept money, determine if a game condition is satisfied, establish leagues, maintain accounts, pay winnings, perform a method to facilitate functionality described herein, and so on. A central authority may include one or more computing devices (e.g., servers, processors, mobile devices, and so on) configured to perform one or more actions in order to facilitate gaming.

One example of a game that may be used in some embodiments may include a Cantor 5 (or Cantor any number) game that may be offered by Cantor Gaming and/or Cantor Data Services. In such a game, a league may be opened (e.g., by player and/or operator). Some non-limiting examples are given in terms of a 2 person league, but a league may be any number of users (e.g., 2, 5, 10, etc.). When a league is full (e.g., players equal to the maximum number have joined), the league may be closed, and a game may be formed between/among the players that joined the league. So, for example, a user may desire to play a $50 dollar Cantor 5 game and so may form a two person Cantor 5 league with a $50 buy-in (e.g., risked amount, contest entry fee) by entering information through a website. A second user may see the formed league through the website and may join the league. At that point, the players may be entered into a $50 game with one another. Cantor may take a cut of the buy-ins for offering the fantasy service and may use the rest of the buy-ins to pay an award to a winner of the game. Cantor may pool the buy-ins into a pool that may be used to provide a winner some award.

At some point before a start of a game and/or some other closing trigger, each player may be required to select members for their fantasy team. Members may be chosen in any manner (e.g., round robin, individually, and so on). In some embodiments, each player may independently choose a team so that a team of one player does not affect to team of another player and that each player may have some or all same players on their team. A gaming operator (e.g., Cantor) may set an expected point total for each team (e.g. based on historical performance of each player on the team). To set such an expected point total Cantor may intentionally skew the number lower to encourage players to choose higher performing players. Based on the assigned expected value of each team, a spread may be created between the team. For example, if team A is expected to earn 95 points and team B is expected to earn 97 points, then a 2 point spread between the teams may be formed. A winner may be determined for the game based on the play of real games so that if Team B, for example, wins by more than two points, team B is the winning team because it beat the spread.

This example Cantor 5 game description is given as an example of some types of fantasy gaming functionality that may be included in part, in whole, and/or not at all in some embodiments.

In some embodiments, a system may be configured to provide one or more participants with fantasy sports contest-related information. Fantasy sports contest-related information may include any suitable information associated with one or more fantasy sports contests. For example, fantasy sports contest-related information may include information regarding a participant's one or more rosters, a participant's standing in one or more fantasy sports contests, point tallies associated with a participant in one or more fantasy sports contests, information regarding the number of trades that a participant may make, information regarding the amount of fantasy money available to a participant for contracting players for a roster, information regarding deadlines to make trades or to perform any other suitable task associated with one or more fantasy sports contests, bracket and/or tier requirements, an outcome of a fantasy game and/or any other suitable information.

In some embodiments, a system may be configured to provide one or more participants with information regarding one or more real life games. Such information may include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events.

Some embodiments may include a pari-mutuel pool for a league. For example, each player that enters a team into a league may pay money. The winner of the league may win at least a portion of the pool of money.

It should be recognized that a fantasy sports game need not be limited or restricted in time. For example, a fantasy sports contest may last an entire season, a portion of the season, a definite period of time (e.g., one month, two weeks, three days, one hour, etc.), the duration of a particular event (e.g., Wimbledon, etc.), a portion of a particular event, or any other suitable period of time. Some embodiments may include determining a time period and/or games that a league covers. Various leagues may cover any desired time period or games. For example a league may cover a set of games in a day, games in a coming weekend, games in a regular season, and so on. Participants in the league may select that information, and/or a gaming operator may set that information. A variety of different lengths of leagues may be offered by a gaming operator.

It should be recognized that these examples are only one non-limiting examples and that any manner of fantasy gaming and/or or other gaming/wagering may be used as desired.

Example Expectations

Some embodiments may include determining characteristics related to a game and/or (possible or actual) member of a fantasy team. For example, some embodiments may include determining an expected number of points that a team and/or member may earn in a game.

For example, some embodiments may include determining an expected number of fantasy point that a plurality of real players in real sports events may earn. In some embodiments, such a determination based on such expectation may be used to impose a requirement on one or more games as discussed elsewhere.

In some embodiments, a skew may intentionally be introduced to such a determination of a characteristic. Such a skew for example may include intentionally lowering an expected points earned by a member of a fantasy team and/or fantasy team in whole than would be expected from statistics.

A determination of an expected number of points may include determining a number of points that the real player is expected to earn based on historic performance of the player. The data may include information indicative of each player's ability to earn points in prior events to events that the game is based on. The historic performance may include performance from all prior games, recent prior game, prior games against an opponent (e.g., team, coach, player) that the member will be playing an upcoming real game that may be used as a basis for determining an outcome of a fantasy game, history of home and/or away games, and so on. Various weightings may be given to historic information to make such a determination. For example, recent games may be given more weight than non-recent games in determining an expected points. If an upcoming game is an away game, away games may be given more weight than home games. Games against same opponents may be given more weight than games against different opponents. It should be recognized that any combination of weights and information may be used in determining an expected number of points for a particular member as desired and that examples given are non-limiting.

Information regarding an expected points for one or more members and/or a manner in which such points has been calculated may be displayed through one or more interfaces in some embodiments.

In one particular non-limiting example, player X may have an expected number of points to be earned in an upcoming game. In the past two seasons, player X may have earned an average of 70 points each game. In the current season, the player may have earned 60 points for two of the three games. One of the three games may have been against team A and member may have earned 80 points. Such information may be received in some embodiments. A determination of an expected points may be made by an algorithm that takes such information into account. For example, an expected number of points may be determined such that expected points are equal to 70 times A (e.g., 0.33)+70 times B (e.g., 0.33)+60 times C (e.g., 0.1)+60 times C (e.g., 0.1)+80 times D (e.g., 0.13). In this example embodiment such an expected number of points may equal 68.6. In some embodiments, such an expectation may be skewed down intentionally (e.g., by a set percentage, by a number of points, if it is great than a threshold, etc.) to, for example 65 points.

In some embodiments, a sum of points of each member of a team may be used to determine an expected number of points for a team. For example, a sum of expected points to be earned by members of a team picked by a first player may be used to determine an expected number of points that the first player's team will earn in the game. As another example, a sum of expected points for each member of a player team may be used to determine an expected number of points for a player team to earn in a game. Such an expected point values may be used in multiplayer games to create spreads between teams In some embodiments, point expectations may be used to form tiers and/or brackets as discussed below. Such tiers may be used to impose a selection requirement on one or more players of a fantasy game. In some such embodiments, a team total may not be relevant and/or a spread may not be used.

It should be recognized that various examples of expectation determination are given as non-limiting examples only. Other embodiments may include any desired methodology. For example, in some embodiments, actual expected events of a real game may be determined (e.g., expected passing yards, expected touchdowns), and based on such expected events, an expected score may be determined. As another example, some embodiments may include adjusting an expectation based on other games (e.g., if many players the thing a particular team will win, the team may be given an increase in expected points; if a player that has a winning record thinks that a team will win, the team may have an adjustment made to the expected points, and so on). In still other embodiments no such expectations may be determined at all.

Tiered Gaming Examples

In some embodiments, any number of players desired may join a fantasy league (or game) (e.g., 1 player, 2 players, 10 players, etc.). Some embodiments may require (e.g., by a gaming operator that runs a fantasy game) each member of a fantasy league (which may also be referred to as a fantasy game) to select a player from each of a plurality of sets of fantasy players (these sets may each be referred to as a tier or a bracket). Players may pay an entry fee to join a league and then select the members of the team from these tiers.

A gaming operator may assign real life players to tiers based on expected performance of the players in actual events on which the fantasy leagues are based. For example, each tier may include players that play in a particular position in a real life sport with a similar expected performance level. For example, a player may be required to select a quarterback from each of three sets of quarterbacks: a low performing quarterback, a middle performing quarterback, and a high performing quarterback. Some embodiments may not differentiate positions but only expected performance (e.g., pick three players from any position that are in each of the three brackets). In some embodiments, such use of bracketing may allow participants in a fantasy league to select players regardless of overlapped picking with other participants in the league, be relatively certain that each member of the league has a relatively similarly skilled team, and exercise different types of fantasy ability than has been provided to players in the past (e.g., select low performing players and to compare players of similar skill levels directly with each other).

In some embodiments, a gaming operator may populate a set of required brackets from which participants in a league may be required to select players to form a fantasy wager. Some embodiments may group such brackets bay player position and/or player performance.

In a player position and performance example, a gaming operator may select a set of required positions (e.g., quarterback, defense, kicker, wide receiver, running back).

A gaming operator may determine a set of players that are playing in each of those positions in an upcoming one or more live games on which the league may be based (e.g., all starting or otherwise possibly playing players in those positions for a set of games being played in an upcoming weekend). For example, if a game or league is to be established for a single weekend, a set of upcoming games on that single weekend may be referenced to determine teams in those games (e.g., from NFL.com or some other source of event information). A roster for those teams may be referenced (e.g., from NFL.com or some other source of team rosters) to determine players for those teams. Accordingly, a gaming operator may determine the set of players that are playing in games related to the fantasy league.

A gaming operator may determine a bracket into which to place one or more of those players (all of the players, some of the players, starting players, etc.). Such a determination may be based on expected performance of each player. For example, an expected number of fantasy points that each player is expected to earn based on past performance may be determined. Information about past performance may be obtained from a source of statistical player data (e.g., NFL.com) and used to determine expected future performance. For example, a player may be expected to perform in line with how they performed in the past, a player's more recent performance may be given greater weight than distant past performance, and so on. Based on the determined expected performance for each player, the players may be placed into brackets that group players into similar expected performances.

As an example, a bracket may be a top third of players, a second bracket may be a middle third of players, and a third bracket may be a bottom third of players in some embodiments. As another example, a bracket may include players within three particular ranges of expected points for each of a set of positions. For example, one bracket may be players that are expected to earn 100-90 points in the quarterback position, a second bracket may be players that are expected to earn 50-60 points in the quarterback position, a third bracket may be players that are expected to earn 10-20 points in the quarterback position, a fourth bracket may be defenses that are expected to earn more than 20 points, and a fifth bracket may be defenses that are expected to earn less than 20 points.

Some embodiments may include defining a set of tiers to include players with similar expected fantasy sports scores. Similar scores may include quantitatively similar and/or qualitatively similar. For example, some embodiments may include placing the best players (e.g., best 6 players) together in a tier and the worst players together in another tier. As another example, some embodiments may include placing players within a particular range of expected scores (e.g., between 50 and 60 points, between 55 and 60 points, between 58 and 60 points) in a tier and players in another range of expected scores in a different tier (e.g., between 10 and 15 points, between 100 and 150 points, between 1 and 3 points). As another example, some embodiments may include placing players within some percentage of a target score in a tier (e.g., within 1% of 60 points, within 5% of 60 points, within 10% of 60 points, within 25% of 60 points) and players within some same or different percentage of a different target score in a different tier (e.g., within 10% of 100 points). As another example, some embodiments may include placing players within some numerical value of a target score in a tier (e.g., plus or minus 5 points from 60, plus or minus 10 points from 60, plus or minus 1 point form 60) and players within a same or different numerical value of a different target score in another tier (e.g., plus or minus 5 points from 100, plus or minus 10 points from 100, plus or minus 1 point form 100). Some embodiments may define tiers so that players only appear in one tier. It should be recognized that various forms of defining a tier may be used in various embodiments.

In some embodiments, a bracket may be determined without reference to a position of players. Another example set of brackets that may be with or without reference to position is the bottom ten, three, or other number of players in one bracket, the top such number of players may be in a second bracket, and the middle such number of players may be in a third bracket.

In some embodiments, all of the players may not be placed in the set of brackets in some embodiments (e.g., players that don't fit into a bracket definition may be not placed into any bracket). In some embodiments, brackets may be defined to allow the placement of all of the players in at least one bracket.

In some embodiments, a top number of players may be broken into three brackets with or without reference to positions and the remaining players may be ignored (e.g., top tiers for quarterbacks, tight ends, and/or defenses). In some embodiments, a bottom number of players may be broken into three brackets with or without reference to positions and the remaining players may be ignored. In some embodiments, some or all of the players may be broken into any number or arrangement of brackets with or without reference to position.

It should be recognized that any number of brackets for each position and/or without reference to position may be formed in any desired manner and these examples are given as non-limiting examples only. In some embodiments there may be one bracket, two brackets, ten brackets, any number of brackets arranged in any manner with or without overlapping players that may appear in more than one bracket and/or more than one position and with or without reference to position.

To enter a league (e.g., play a game), a participant may be asked to select one player from each of the established brackets. The selected players may form that participant's team. For example, a player may be required to pick one quarterback from each of three quarterback brackets and one defense from each of three defense brackets. The collective six selections may form a tiered fantasy team for the player. Any number of players may play against one another and/or against a par by selecting such a team to play a game. It should be recognized that the quarterback and defense example is given as a non-limiting example and that various embodiments may include any arrangements and number with or without reference to position.

Each participant in a league may have a similar number of players with a similar total expected point total (because they are selected from same brackets that group players by expected point totals). In fact, in some embodiments where players are allowed to be selected by multiple participants, some participants may even have the exact same teams. In some embodiments, players may only be allowed to be selected by one participant in the league, so identical teams in a single league may not occur.

In some embodiments, participants may be able to see other participants' teams (in a multi-player game) prior to selecting their own (e.g., participants that joined the league before them), may pick teams in a round robin fashion once all participants join the league (so that they may see how what players other participants have picked so far in their team), may not see until the participants have all selected their teams, may not see teams until a game begins or some time threshold at or before which players are required to select teams occurs, and/or may be able to or unable to view other players teams in any manner. In some embodiments, teams in a league may include the same player any number of times (e.g., so each or some may end up being the same). In some embodiments teams in a league may include unique players (so each may be different). In some embodiments, player selection may take place in a first come first get, round robin, and so on method as desired. This methodology may be based on whether or not players are unique in a league.

Forming League Examples

Some embodiments may include forming or establishing a fantasy league that one or more players can join. A league may be formed by a gaming operator. A fantasy sports league may be formed to include friends, acquaintances, strangers, may be formed at a casino, through a web site, using an interface, and so on. Forming a league may include determining one or more rules or characteristics for the league and/or allowing participants to join the league (e.g., publishing, storing information in a database, allowing selection of players in brackets, etc.). In some embodiments, a player may request a game with certain characteristics (e.g. buy in amount, prize pool, number of players) and a gaming operator may form such a game so that the player may play it (e.g., against the gaming operator as a single player game and/or so other players may join the game to play against the requesting player).

For each league, a buy in amount may be determined. Each league may have a buy in cost (e.g., a wager amount). Such a buy in amount may be structured in a variety of ways as is desired by a gaming operator. For example, in some embodiments, a buy in may include an amount of money placed in a pari-mutuel pool. In some embodiments, a buy in may include a wager against a house. In some embodiments, a buy in may include an entry fee into a contest (e.g., a contest involving other players). In some embodiments, an amount of a payout may be related to a number of participants, a buy-in amount, and so on. Such an amount may be determined before a league is formed and/or players are allowed to join the league. In some embodiments, a buy in amount (and/or portion thereof) may be taken by a gaming operator and a pre-established payout amount may be paid to a winner of the league and/or split amount tied winners (from a remaining portion of a buy in amount and/or from some other source of money).

Some embodiments may include determining a number of required participants for a league. A league may start when the desired minimum number of participants joins the league. If the desired number of participants does not join the league, the league may be cancelled (e.g., by the time the league is scheduled to start such as when the first game on which the league is based begins). The required or minimum number may be different from league to league as desired by a gaming operator.

In some embodiments, a league may have a maximum number of participants and a gaming operator may determine that maximum. The maximum may be the same as the minimum in some embodiments so that there is only one possible number of participants for a league to start. The maximum may be different from league to league and/or different than the minimum. If the number of participants exceeds the minimum the league may have enough to start. For each participant over the minimum up to the maximum, the participants in the league may earn a reduction in buy in fee, a larger possible payout, a bonus of some sort, points to play point play games, and/or any bonus as desired. A league may have any number of participants in it. For example, a league may begin with one participant, two participants, 8 participants, 100 participants, and so on.

In some embodiments, a gaming operator may determine a payout amount of a league. A payout amount may be based on the buy in amount and required players so that the gaming operator makes some money for hosting the league, so that the entire buy in money is paid out, and/or in any manner. The payout amount may be an amount that is paid to one or more winners of the league.

Participants may select to join one or more leagues with one or more established rules or characteristics. Such leagues may be published and selectable through an interface of a computing device. The players may operate a control to select to join the league. Participants may be matched with other players (e.g., by submitting a desire to be put into some league and being matched with other players that have a similar desire).

When joining the league and/or at the star of the league, the players may be required to select a team from the brackets, and pay the buying fee (e.g., by having money removed from a wagering account, paying a cashier, swiping a credit card, etc.).

A gaming operator may establish various leagues with a variety of participant numbers, buy in amount, payout amounts, and/or other rules to satisfy its expected and/or actual player desires.

A gaming operator may also allow participants to establish private leagues or on demand leagues. For example, a player may establish a number of participants for a league of his own choosing and a buying amount for the league. In some embodiments, that league may be created for the participant. The player may keep the league private to his friends or make it public for everyone. For example, a player may have the gaming operator send out information about the league to specific friends so that they may join the league by invitation only. A payout amount may be determined for the league based on the buy in and/or the number of people that will be in the minimum for the league. The former of the league may send email, private messages, and/or other communications to the friends or other people they want to invite in the league. In some embodiments, only those invited people may join a private league. The private league may otherwise operate similar to a public league. In some embodiments, rather than a buy in amount being chosen by the participant, the payout amount may be chosen and the by in amount may be determined based on the payout and number of participants. In other embodiments neither the buy in or payout may be determined by the participant. It should be recognized that any information may be determined by the participant and/or the gaming operator in any combination to form a league. A private league (and/or public league) may include parameters such as specific brackets that are required selected by a player that requests the league.

It should be recognized that examples of leagues and forming of leagues are given as non-limiting examples only.

Outcome Examples

In some embodiments, outcomes of a game of a fantasy sport may be based on performance statistics and/or happenings related to the sport. For example, one or more Major League Baseball games may be a source of such performance statistics. As another example, game logs from NFL-.com may be a source of such performance statistics (e.g., a central authority may access the game logs through a communication network and analyze events in the logs to assign points to one or more fantasy teams). Any number and/or combination of sources may be used. In some embodiments, an outcome related to a participant associated with a first fantasy team may be based on actual performance of the active players that are members of the fantasy team in real life games. A participant's success or failure in a game may correspond to the performance of the active real-life players in one or more real-life games. In some embodiments, the performance of all and/or some members of two or more fantasy teams in real life may be used collectively to determine an outcome of a game involving the two or more fantasy teams and/or points to award to one or more fantasy teams.

In some embodiments, a central authority may compile and/or access statistics related to events in the sport. Such statistics may include, for example, a number of points scored by each player, a number of bases stolen, a number of yards run, a number of passes completed, a finishing position, a number of assists, a number of interceptions, a number of blocks, and so on.

In some embodiments, an outcome of a fantasy sports game may be based on the statistics and/or one or more events in one or more games. For example, in some embodiments, a participant may be awarded a number of points for each goal scored in a soccer game if the player that scored the goal in real life corresponds to a member of the participant's fantasy team. Any action may correspond to any number of points to any one or more participants in any direction (e.g., a block by a member of a first fantasy team may subtract one point from a participant associated with a second fantasy team).

It should be recognized that any desired method of determining an outcome based on performance may be used in various embodiments. In some embodiments, such method may be simple and/or complex models of games. For example, any algorithm or formula may be applied to statistics for one or more real life players to determine a fantasy score earned by those players by performing according to those statistics.

An outcome of a fantasy sports league may be determined based on the actual performance of the real life sports players. The winner of the league may be the person who ends the set of games on which the league is based on with the highest number of fantasy spots points for his team. That player may win the payout amount associated with the league. There may be a tie and if so, the system may cancel the league, and/or split the money of the payout with the number of people tied for first place in the league.

System Examples

Some embodiments may include a fantasy sports system or other gaming system of a gaming operator. One example fantasy sports system 100 is illustrated in FIG. 1. As illustrated, fantasy sports system 100 may include a gaming system 101, an event server 103, a network 105, a client computing device 107, a staff computing device 109, a mobile device 111, and an event source 113.

Gaming system 101 may be configured to perform any desired services related to a game. For example, gaming system 101 may receive one or more indications regarding a game. gaming system 101 may determine expected values of a members, may assign members to brackets, may enforce bracket rules, may enter participants into a league, may form leagues, may maintain leagues, may determine if leagues have reached a minimum number of participants, may audit games, may provide outcomes of games, may act as treasurer or house for a game, may provide gaming opportunities, and so on. In some embodiments, gaming system 101 may allow a participant to enter into a league of their choice and/or form a new league. It should be recognized that gaming system 101 may include any number of systems, computing devices, and/or any desired components. gaming system 101 may form brackets and/or assign players into brackets for selection by league participants.

Event server 103 may be configured to receive and/or process information regarding events. The events may include real life sporting events. For example, events may include hits, runs, completed passes, incomplete passes, interceptions, catches, bases stole, blocks, three point shots, steals, fumbles, shots on goal, and/or any other information. Events may include events at a recent game and/or events from non-recent games. Events may be received substantially simultaneously as the event happening.

Event server 103 may determine fantasy sport outcomes and/or points based on the events. For example, in an embodiment in which a participant receives a point if a real life player that corresponds to a member of the participant's fantasy sports team scores a touchdown, then the event server may be configured to add a point to the participant when information identifying that the player scored the touchdown is received. In some embodiments, event server 103 may be configured to maintain historical records of event information. Such information may be used periodically to determine outcomes and/or points. In some embodiments, event information may be used to determine performance values for a fantasy sports team.

Some examples of receiving and processing event information are described in U.S. patent application Ser. No. 12/367,566 to Plott and entitled Mobile Gaming Alert, which is hereby incorporated herein by reference.

Network 105 may include and desired communication network or networks. Network 105 may include wired portions and/or wireless portions. Network 105 may include a local network, the internet, and/or any desired network. Network 105 may allow portions of system 100 to communicate among one another and/or outside systems.

Client computing device 107 may include any desired computing device. Client computing device may be configured to allow a participant to enter and/or access information regarding a fantasy sports league. For example, client computing device 107 may include a network connected computer at a casino, at a remote location, and/or at any desired location. Client computing device 107 may include a special purpose computer configured to display sporting statistics, game feeds, wager option and so on one or more displays. Client computing device 107 may include input and/or output elements for money related to one or more games (e.g., a ticket in ticket out device, a credit card device, a cash dispenser, a cash intake element, etc.). Client computing device 107 may communicate with one or more other elements of system 100, such as gaming system 101 to submit or receive information. System 100 may include any number of client computing devices that may allow any number of participants to play any number of fantasy sports games.

Staff computing device 109 may include a computing device configured to be operated by a staff member of a gaming establishment, such as a casino. Staff computing device 109 may include a device at a sports book at which a participant may tell a staff member about a desired game, the staff member may enter the information to create a league, enter a league, select a player, and so on.

Mobile device 111 may include any desired mobile computing device. For example, mobile device 111 may include a mobile telecommunications device such as a cell phone, a mobile gaming device and so on. An example mobile gaming device is described in U.S. patent application Ser. No. 11/868,013 to Lutnick and entitled Game of Chance Processing Apparatus, which is hereby incorporated herein by reference. Other example mobile gaming devices may include tablet computers, smartphones, and so on. Mobile device 111 may communicate over a wireless network, such as a portion of network 105. Mobile device 111 may allow a participant to enter and/or receive information related to a fantasy sports team and/or game.

Event source 113 may include any desired source of information related to events. For example, event source 113 may include a television, an rss feed, a news feed, a newspaper publication, an announcer, a web site, a log of events, a phone system, a television, and so on. Event source 113 may be part of system 100 or may be separate form system 100 (e.g., a system run by a sports league or television channel such as ESPN, NFL.com, and so on). Event source may be connected to the internet and provide information about events to system 100.

It should be recognized that system 100 is given as an example only. Various embodiments may include additional, alternative, fewer, different, and so on components as desired. For example, some embodiments may include a web server, an authentication server, a social networking sever, and/or other servers as desired. It should be recognized that system 100 may not be a singular system, but rather may include various components that may be owned, operated, and/or manufactured by different entities.

In some embodiments, a system may be configured to provide one or more participants with fantasy sports contest-related information. Fantasy sports contest-related information may include any suitable information associated with one or more fantasy sports contests. For example, fantasy sports contest-related information may include information regarding bracket requirements, information regarding a participant's one or more rosters, a participant's standing in one or more fantasy sports contests, point tallies associated with a participant in one or more fantasy sports contests, information regarding the number of trades that a participant may make, information regarding the amount of fantasy money available to a participant for contracting players for a roster, information regarding deadlines to make trades or to perform any other suitable task associated with one or more fantasy sports contests, an outcome of a fantasy game and/or any other suitable information.

In some embodiments, a system may be configured to provide one or more participants with information regarding one or more real life games. Such information may include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events.

In some embodiments, use of a computing device may provide an ability to calculate expected scores from historical information and define tiers so that players may play in a fantasy sports game. Calculating such information may include large amounts of data processing that may be prohibitive for a human to do alone.

Method Examples

Figure 2:
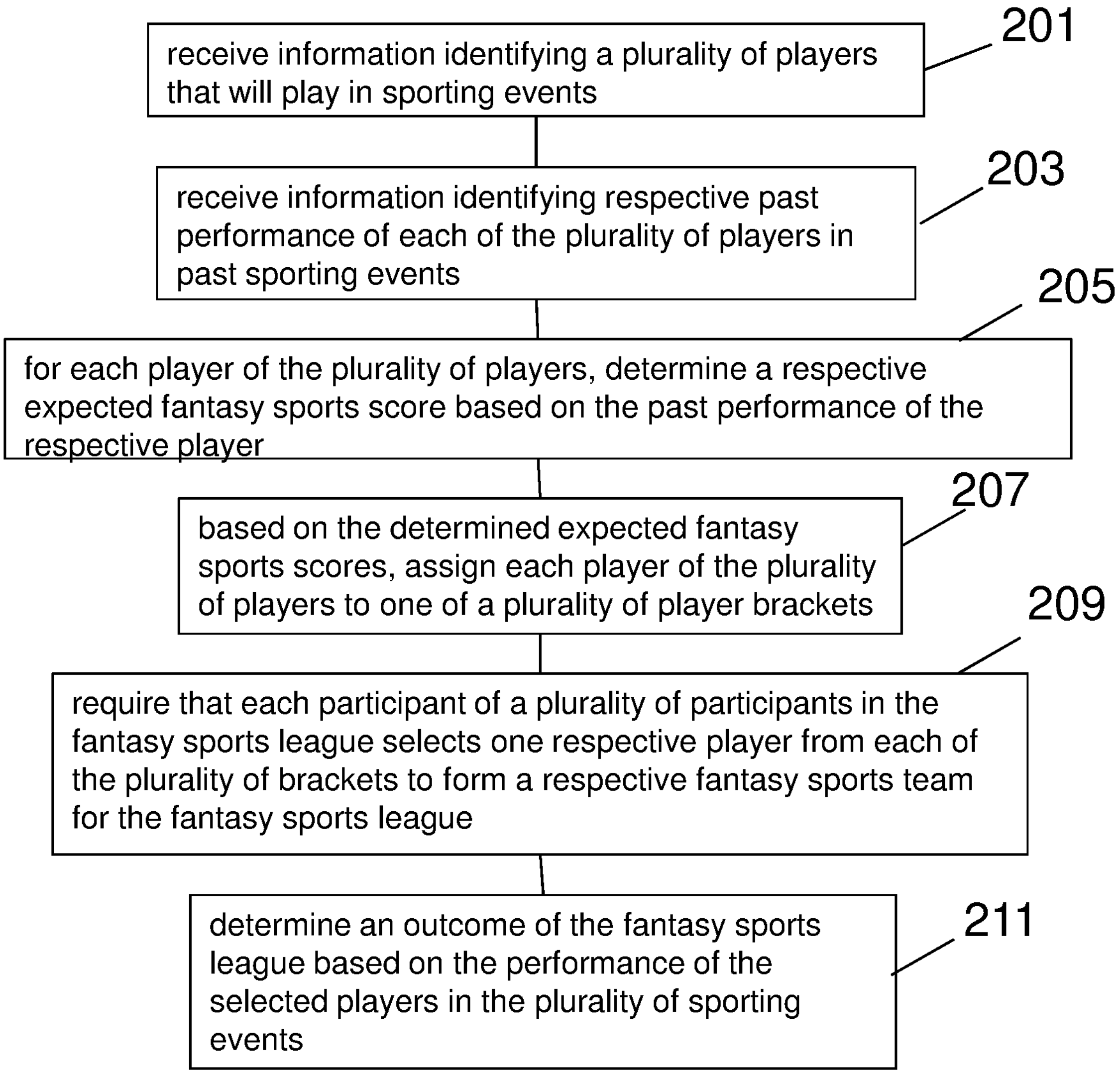
FIG. 2 shows an example method that may be used in some embodiments.

FIG. 2 illustrates an example process 200 that may be performed in some embodiments. Such a method may be performed by a gaming operator, such as a website operator, a mobile app provider, a casino, a player, and so on. Such a method may be performed by a system such as system 100 (and/or one or more elements thereof) and/or any other desired computing device or devices.

As indicated at block 201, some embodiments may receive information identifying a plurality of players that will play in sporting events. For example, roster information for an upcoming set of games on which a fantasy sports league is based may be received.

As indicated at block 203, some embodiments may receive information identifying respective past performance of each of the plurality of players in past sporting events. For example statistical performance information about player performance in past sporting events may be received.

As indicated at block 205, some embodiments may: for each player of the plurality of players, determine a respective expected fantasy sports score based on the past performance of the respective player. In some embodiments, each expected fantasy sports scores identifies a respective expected number of fantasy sports points that a respective player will earn when selected for a team in a fantasy sports league. Some embodiments may determine which players to obtain play information about based on roster information received (e.g., may obtain information about starting players, players that are expected to play in an upcoming real game on which a fantasy game is based, etc.).

As indicated at block 207, some embodiments may: based on the determined expected fantasy sports scores, assign each player of the plurality of players to one of a plurality of player brackets. In some embodiments, information (e.g., roster information, past performance information, etc.) about some players may be receive but an expected performance value may not be determined for that player and\or the player may not be assigned to a bracket. In some embodiments, the brackets may group players that are determined to have similar expected fantasy sports scores into same brackets. In some embodiments, the brackets may be further based on a position of the player so that players with the same position are in the same bracket and players with different positions are in different brackets. Not all players may be assigned to a bracket in all embodiments. Some embodiments may include determining whether to assign a player to a particular bracket and/or any bracket based on a roster information and/or expected performance of the player. Players may be assigned to brackets that are desired for a particular gaming experience (e.g., based on the definitions of the brackets and/or the set of brackets that are required for a particular game).

Some embodiments may include determining definitions of a plurality of brackets. For example, brackets may be defined to include top 3 quarterbacks, bottom three quarterback, middle 3 quarterbacks, and so on. Various non-limiting examples of bracket definitions are described herein. Determining a bracket definition may be done based on expected performance values and/or roster information, based on fantasy player desires, based on gaming operator desires, and so on to create an exciting gaming opportunity. Players may be assigned to the brackets based on the bracket definitions. In some embodiments there may be no such definition s and/or the definition may be defined so that a particular number of percentage of players appear in each bracket.

Some embodiments may include forming public leagues for participants to join. Some embodiments may include receiving a request to form a league with characteristics defined by a participant. Such a league may include a private or public league. Some embodiments may include determining characteristics for a league (e.g., payout amount based on buy in amount and number, brackets based on upcoming events and/or fantasy player requests). Some embodiments may include receiving invitation information for a private league and inviting identified participants in response.

Some embodiments may include determining whether a required number of participants have joined a league by the start time of the league. Some embodiments may include preventing more than that number or some maximum number from joining the league. Some embodiments may include canceling the league if less than the required number joins by some start time (e.g. start of the first game on which the league is based). Cancelation may include returning money for a buy in cost to the participants (e.g., possibly minus some fee). If the required number of participants joins the league, then the league may run.

As indicated at block 209, some embodiments may require that each participant of a plurality of participants in the fantasy sports league selects one respective player from each of the plurality of brackets to form a respective fantasy sports team for the fantasy sports league. For example, an interface may be presented through which the participants must each select the required players from displayed brackets of players. Some embodiments may include receiving a selection of such fantasy team members from each player in a game.

As indicated at block 211, some embodiments may determine an outcome of the fantasy sports league based on the performance of the selected players in the plurality of sporting events. For example, actual performance of players may be used to determine the outcome of the league. Not all players may be selected so not all player information may be used to determine the result in every league.

Some embodiments may include paying a payout to the player that has the highest score and/or splitting the payout if there is a tie. For example, a gaming operator may sum up points earned by players on each fantasy team and compare the sums. A player with a highest sum may win.

In some embodiments, each bracket may be treated as a separate event or part of a parlay. For example, a player that wins in the most number of brackets may win a game even if they score fewer points than another player. For example, a game may include 10 tiers of players (e.g., 6 players in each tier) that each have comparable expected fantasy scores and same positions. Two or more players may form teams by choosing a member form each tier. A gaming operator may determine a winning player for each tier by comparing selected members for that tier (e.g., winner may be the player that selected a member who earns more points for the fantasy game based on actual performance in a real sport game). A winner for a game may be determined by the gaming operator to be a player that wins the most tiers. This method may emphasize a player's ability to select best players from a group over a summed comparison method thereby introducing a heightened element of skill.

Ties may be treated in a variety of manners. For example, in some embodiments if two players pick a same member for a tier, those players may tie in the tier. In some embodiments players may be prevented from picking same members in a tier to prevent this tie (e.g., in a round robin picking fashion). As another example, if two players win a same number of tiers, those players may tie in a game. In some embodiments, a tie in a game may result in players splitting a prize pool and/or being refunded their buy-ins. In some embodiments, a tie may be resolved in another manner. For example, a total points earned by players may be used to break a tie and/or some other secondary factor may be used (e.g., tie goes to the person that selected members that sum to a lowest expected point total). As another example secondary factor, some embodiments may include determining a sum by which each player wins the tiers that they won in the game. The player that wins by the largest sum may be the winner of the game. In some embodiments, a tertiary measure may be applied if a secondary measure still results in a tie game.

Some embodiments may include determining that a primary game outcome results in a tie (e.g., same number of points earned by teams and/or same number of tiers won by teams). In response, a gaming operator may apply a secondary tie breaking outcome determination method (e.g., lowest expectation sum, highest win by sum across tiers, highest points scored by teams). Some embodiments may include determining that the secondary outcome determining method results in a tie. In response, a gaming operator may apply a tertiary outcome determination method. Any level of outcome determination methods may be used in any combination. In some embodiments a final level (e.g., a third level) may be reached and in response, the game may actually be called a tie (e.g., a prize pool may be split and/or a buy-ins may be returned).

In some embodiments, each tier may be associated with a prize pool rather than a whole game being associated with a prize pool as discussed in some embodiments. The prize pools may be the same amount and/or different amounts. For example, a highest performance tier may have a highest prize pool and a lowest performance tier may have a lowest prize pool. For each tier that is won by a player, that player may win the prize pool for that tier. Accordingly, a player may, in some situations win more tiers but also win less money if the prize pools are arranged to allow that outcome to occur.

Although some examples have been discussed in terms of a player earning more points in total or individual brackets to win a game, it should be recognized that such examples are non-limiting. In some embodiments, players may aim to choose a lowest level of players in each tier and/or a set of players (one from each tier) that will score a summed lowest amount of fantasy points. Such a reverse tiered game may offer players with a unique challenge to choose poor performing players. Some embodiments may include choosing an average player for one or more tiers. Some embodiments may mix and match a best and reverse tiering method and/or any other tiering method desired to create rules for a game.

Such a reverse tier game may provide a gaming operator with additional information that may be used in various manners. For example, normally players choose best players or teams in games. By offering players an opportunity to choose worst teams and/or players, a gaming operator may gain insight into the overall evaluation of bad players. A gaming operator may use that information to adjust odds in other games such as sports book games. Such information may further provide a gaming operator with information that may flesh out a player profile (e.g., adding disfavored players and/or teams to a player profile). Such information may allow further advertising and/or profiling of players than typical gaming options.

Such a reverse tier method may offer hedging options to players, professionals, and/or gaming operators that may not normally be available in a standard tier game. For example, in some embodiments, a player may desire to hedge against a player performing well. A traditional gaming setting does not allow a player to choose that a player will perform poorly and win any award based on that performance. A reverse tiering option may provide that hedging option to such players. Further, a gaming operator that books bets may desire to find ways to offset risk in its book of bets. A bet against a player in such a reverse tier method may provide that opportunity for a traditional wager on that player. As still another example, pooled wagering opportunities such as those discussed in U.S. patent application Ser. No. 13/760,631 to Amaitis, which is hereby incorporated herein by reference may desire hedging opportunities for an algorithmic gaming or professional gaming entity. Such reverse tier examples give that hedging option that may otherwise not be available.

Although some examples are given in terms of a multiplayer game, some embodiments may include a single player game such as a game against a house or gaming entity. In such a game, a gaming entity may establish a par value (e.g., based on an average score expectation for players in the brackets) and a player may win or lose based on a comparison of points earned by a player's team to the par value. Another example of such a game may include a player playing against a gaming operator selected team.

It should be recognized that this method is an example only. Other methods may include additional, alternative, different, more, fewer, none, some similar, and so on actions in any desired order in any combination with any one or more features described herein.

It should be recognized that while various embodiments are described as being monetary wagering, that some embodiments may include point based wagering. Such points may include no monetary value. Some examples of point based wagering are described in U.S. patent application Ser. No. 13/689,218 to Amaitis, entitled Points and/or Money Based Gaming, which is hereby incorporated herein by reference.

The following sections provide a guide to interpreting the present application.

II. Terms

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiments are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. § 112, Paragraph 6

In a claim, a limitation of the claim which includes the phrase “means for” or the phrase “step for” means that 35 U.S.C. § 112, paragraph 6, applies to that limitation.

In a claim, a limitation of the claim which does not include the phrase “means for” or the phrase “step for” means that 35 U.S.C. § 112, paragraph 6 does not apply to that limitation, regardless of whether that limitation recites a function without recitation of structure, material or acts for performing that function. For example, in a claim, the mere use of the phrase “step of” or the phrase “steps of” in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase “does not include” or by the phrase “cannot perform”.

X. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XIII. Apparatus for Playing Over a Communications System

In some embodiments, there is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40 and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

The invention claimed is:

1. An apparatus comprising:

at least one processor configured to control:

receiving, for each player of a plurality of players that will play in a plurality of competition events, a respective expected fantasy competition score based on past performance of the respective player, in which each expected fantasy competition score identifies a respective expected number of fantasy competition points that a respective player is expected to earn when selected for a team in a fantasy competition game;

based on the expected fantasy competition scores, assigning at least some of the plurality of players to one of a plurality of player tiers, in which each player tier includes players determined to have similar expected fantasy competition scores;

transmitting display information over a communication network to cause a graphical user interface of a computing device of each participant of a plurality of participants in the fantasy competition game to display the plurality of player tiers respectively with the players thereof and indicia indicating a requirement for the each participant to select one respective player from each of the plurality of player tiers to form a respective fantasy competition team for the fantasy competition game;

receiving, over the communication network, selection information from each of the computing devices, in which the selection information indicates selection operations by the each participant, on the graphical user interface of the corresponding computing device, selecting one respective player from each of the plurality of player tiers;

receiving, over the communication network, information regarding a real life event, the real life event including event at a recent game or events from non-recent games; and determining an outcome of the fantasy competition game based on performance of the selected players in the plurality of competition events and based on the real life event.

2. The apparatus of claim 1, in which the at least one processor is configured to control:

determining a required number of participants for the fantasy competition game;

allowing participants to join the fantasy competition game until the required number of participants are reached; and determining that the fantasy competition game should be played based on the required number of participants being reached.

3. The apparatus of claim 2, in which the at least one processor is configured to control:

determining, for a second fantasy competition game, that a second required number of participants joining the second fantasy competition game is not reached, and in response to determining the second required number is not reached, canceling the second fantasy competition game.

4. The apparatus of claim 1, in which the at least one processor is configured to control:

receiving information identifying which competition position in the plurality of competition events each of the plurality of players plays; and in which assigning each player to one of the plurality of player tiers includes assigning each player to a player tier which is based on expected fantasy competition scores and defined to include only players in a single competition position.

5. The apparatus of claim 4, in which each fantasy competition team of each player in the fantasy competition game is required to include a respective player from each player tier, and in which multiple player tiers of the plurality of player tiers are player tiers for a same competition position but different expected fantasy competition score levels.

6. The apparatus of claim 1, in which the fantasy competition game includes a required buy in amount that each participant of the plurality of participants pays to play in the fantasy competition game, the buy in amount includes an amount of money placed in a pari-mutuel pool, a wager against house, or an entry fee into a contest involving other players; and in which the fantasy competition game includes a payout amount that is determined before the fantasy competition game is formed and that is paid based on the outcome of the fantasy competition game.

7. The apparatus of claim 1, in which the at least one processor is configured to control:

receiving, over the communication network, a request from a first participant of the plurality of participants to form the fantasy competition game, in which the request identifies a number of participants of the plurality of participants, an identity of others of the plurality of participants, and a buy in amount for entering the fantasy competition game that is payable to a gaming operator operating the computing device of the first participant; and in response to receiving the request, inviting the others of the plurality of participants to the fantasy competition game, starting the fantasy competition game when a predetermined minimum number of the plurality of participants set by a gaming operator is met, charging the first participant and one or more of the others of the plurality of participants the buy in amount, and determining a payout for winning the fantasy competition game based on a number of the plurality of participants and the buy in amount.

8. The apparatus of claim 1, in which the at least one processor is configured to control:

receiving, over the communication network, a request from a first participant of the plurality of participants to form the fantasy competition game, in which the request identifies a number of participants of the plurality of participants, an identity of others of the plurality of participants, and a payout amount that is payable from a gaming operator operating the computing device of the first participant based on the outcome; and in response to receiving the request, inviting the others of the plurality of participants to the fantasy competition game, starting the fantasy competition game when a predetermined minimum number of the plurality of participants set by a gaming operator is met, determining a buy in amount based on a number of the plurality of participants and the payout amount, and charging the first participant and the others of the plurality of participants the buy in amount.

9. The apparatus of claim 1, in which the plurality of players includes a subset of players that participate in the competition events.

10. The apparatus of claim 1, in which determining the outcome includes:

for each player tier, determining which participant of the plurality of participants selected a highest performing player based on play in one or more of the plurality of competition events; and determining a winner of the fantasy competition game to be a participant that selected the most number of said highest performing players.

11. The apparatus of claim 1, in which determining the outcome includes:

for each player tier, determining which participant of the plurality of participants selected a highest performing player based on play in one or more of the plurality of competition events;

determining that at least two participants of the plurality of participants selected an equal and highest number of said highest performing players; and in response to determining that at least two participants of the plurality of participants selected the equal and highest number of said highest performing players, applying a secondary outcome determination method.

12. The apparatus of claim 11, in which the secondary outcome determination method includes determining the outcome based on a comparison of sums by which each participant of the at least two participants won each of the player tiers won by the two participants.

13. The apparatus of claim 11, in which the at least one processor is configured to control, when the secondary outcome determination method results in a tie, splitting a prize pool for the fantasy competition game between the at least two participants.

14. The apparatus of claim 1, in which determining the outcome includes:

for each participant, determining a sum of fantasy competition scores earned by the players selected by the participant based on play in one or more of the plurality of competition events; and determining a winner of the fantasy competition game to be a participant that has the highest said sum.

15. The apparatus of claim 1, in which determining the outcome includes:

for each participant, determining a sum of fantasy competition scores earned by the players selected by the participant based on play in one or more of the plurality of competition events; and determining a winner of the fantasy competition game to be a participant that has the lowest said sum.

16. The apparatus of claim 1, in which the at least one processor is configured to control:

determining a respective range of fantasy competition scores for each of the plurality of player tiers; and in which the assigning the at least some of the players includes assigning each player of the at least some of the players to a respective single tier that is defined by a range in which the expected fantasy score of the player falls.

17. The apparatus of claim 1, in which the assigning the at least some of the plurality of players includes: determining which of the plurality of players will start in the competition events; and assigning only at least part of said players that will start to the plurality of player tiers.

18. The apparatus of claim 1, in which the at least one processor is configured to control:

defining each player tier of the plurality of player tiers to include a set number of players.

19. The apparatus of claim 1, in which each player tier is defined to include different players from every other player tier, in which each player tier is defined so that players in the player tier include similarly valued expected fantasy competition scores, and in which each participant is required to select one and only one player from every player tier to play the fantasy competition game.

20. A method comprising:

controlling, by at least one processor:

receiving, for each player of a plurality of players that will play in a plurality of competition events, a respective expected fantasy competition score based on past performance of the respective player, in which each expected fantasy competition scores identifies a respective expected number of fantasy competition points that a respective player is expected to earn when selected for a team in a fantasy competition game;

based on the expected fantasy competition scores, assigning at least some of the plurality of players to one of a plurality of player tiers, in which each player tier includes players that are determined to have similar expected fantasy competition scores;

transmitting display information over a communication network to cause a graphical user interface of a computing device of each participant of a plurality of participants in the fantasy competition game to display the plurality of player tiers respectively with the players thereof and indicia indicating a requirement for the each participant to select one respective player from each of the plurality of player tiers to form a respective fantasy competition team for the fantasy competition game;

receiving, over the communication network, selection information from each of the computing devices, in which the selection information indicates selection operations by the each participant, on the graphical user interface of the corresponding computing device, selecting one respective player from each of the plurality of player tiers;

receiving, over the communication network, information regarding a real life event, the real life event including event at a recent game or events from non-recent games; and determining an outcome of the fantasy competition game based on performance of the selected players in the plurality of competition events and based on the real life event.

* * * * *